(12) United States Patent
Andersen (10) Patent No.: US 7,041,323 B2
(45) Date of Patent: May 9, 2006

(54) METHOD FOR PROVIDING A CHEESE BY ADDING A LACTIC ACID BACTERIAL STARTER CULTURE TO THE CHEESE CURD

(75) Inventor: Kim Toft Andersen, Kolding (DK)

(73) Assignee: Lact Innovation APS, Kolding (DK)

( * ) Notice: Subject to any disclaimer, the term of this patent is extended or adjusted under 35 U.S.C. 154(b) by 0 days.

(21) Appl. No.: 10/258,462

(22) PCT Filed: Apr. 27, 2001

(86) PCT No.: PCT/DK01/00284

§ 371 (c)(1),
(2), (4) Date: Nov. 19, 2002

(87) PCT Pub. No.: WO01/80655

PCT Pub. Date: Nov. 1, 2001

(65) Prior Publication Data

US 2003/0129275 A1    Jul. 10, 2003

Related U.S. Application Data

(60) Provisional application No. 60/200,349, filed on Apr. 28, 2000.

(30) Foreign Application Priority Data

Apr. 27, 2000 (DK) ............................... 2000 00694

(51) Int. Cl.
    *A23C 9/12* (2006.01)
(52) U.S. Cl. ............................ 426/38; 426/35; 426/36; 426/37; 426/39; 426/582
(58) Field of Classification Search .................. 426/34, 426/36, 37, 38, 39, 40, 42, 43, 580, 582, 426/35
See application file for complete search history.

(56) References Cited

U.S. PATENT DOCUMENTS

| 4,020,185 A | 4/1977 | Andersen et al. |
| 5,130,148 A | 7/1992 | Brown et al. |
| 6,103,277 A * | 8/2000 | Leufstedt et al. ............... 426/8 |

FOREIGN PATENT DOCUMENTS

| EP | 0365173 | 10/1989 |
| WO | WO83/03523 | 10/1983 |
| WO | 8502980 | 7/1985 |
| WO | 9302565 | 2/1993 |

OTHER PUBLICATIONS

Lawrence, R.C., "Incorporation of whey proteins in cheese", pp. 79-87, Factors Affecting the Yield of Cheese, 1991, International Dairy Federation, 41, Square Vergote, B-1040 Brussels, Belgium.

* cited by examiner

*Primary Examiner*—Leslie Wong
(74) *Attorney, Agent, or Firm*—Ladas & Parry LLP (57) ABSTRACT

The present invention relates to the field of cheese manufacturing. In particular, there is provided a novel method for making cheese involving the preparation of a cheese curd using a curdling agent and wherein a lactic acid bacterial starter culture is introduced into the resulting cheese curd. The advantage of the present method is that is possible to produce a large amount of cheese curd which may subsequently be divided into smaller portions each of which can be inoculated with specific and designed lactic acid bacterial starter culture to obtain different types of cheese or different ripening profile (storage time) for the same cheese type. Thus, this method is useful in the manufacturing of a variety of cheese types originating from a single curd.

15 Claims, 2 Drawing Sheets

METHOD FOR PROVIDING A CHEESE BY ADDING A LACTIC ACID BACTERIAL STARTER CULTURE TO THE CHEESE CURD

This application is a National Stage Filing of PCT/DK01/00284 filed Apr. 27, 2001, which claims the benefits of Provisional Application No 60/200,349 filed Apr. 28, 2000.

FIELD OF THE INVENTION

The present invention relates to the field of cheese manufacturing. In particular, there is provided a novel method for providing a cheese wherein the cheese curd is prepared by using a curdling agent and where subsequently a lactic acid bacterial starter culture is added to the cheese curd. The method is useful in the manufacturing of a variety of cheese types originating from a single curd.

TECHNICAL BACKGROUND OF THE INVENTION

Cheese is a fresh or ripened dairy product consisting predominantly of varying amounts of coagulated milk proteins, fat, water and salts. There is an enormous variety of cheese types of different regional origins, traditions of consumption, chemical composition, texture, taste, flavour and shelf life. Thus, processes for making cheese are different for each different type of cheese to be made.

In principle, there are a number of main steps in the cheese manufacturing process which are essentially the same for all cheeses: Generally, milk intended for the cheese making is pasteurised, i.e. subjected to a heat treatment to kill pathogens and spoilage bacteria such as coliform bacteria which may spoil the cheese by producing large amounts of gas and an unpleasant flavour. The milk is then usually standardised in order to obtain the appropriate ratio of components which is specific for the particular cheese variety.

Subsequently, a microbial starter culture and a milk clotting agent are added to initiate a specific enzymatic proteolysis of milk proteins leading to the destabilisation of the casein micelles and consequently to the coagulation of the milk. Milk clotting agents include native enzymes derived from microbial or animal tissue sources, or the enzymes may be provided as gene products of recombinant cells expressing a milk clotting enzyme of animal or microbial origin.

Starter cultures are often cultures of acid-producing bacteria which are added to the cheese milk in order to provide the pH, desired taste, aroma and texture of the resulting cheese and to reduce the pH of the cheese milk as the activity of the added milk clotting enzyme is higher in acidic media. Furthermore, the reduction in pH brought about by the metabolism of the starter culture organism inhibits the growth of undesirable microorganisms and prevents biochemical reactions.

In addition to the production of acids and flavour compounds, the starter culture organisms also produce and/or contain proteases, peptidases and aminopeptidases that, like a milk clotting agent, degrade the proteins and carbohydrates present in the milk, in a non-specific manner, and which is important for the ripening of the cheese.

After an appropriate time interval, during which the coagulum is cut and stirred, allowing for sufficient syneresis, the whey is drained off. The remaining material is referred to as a curd. Depending on the kind of cheese to be made, the curd is subsequently pressed into a shape and consistency that are characteristic for the particular type of cheese and usually transferred to a brine solution in order to be salted. The pH of a traditional curd is between pH 5.6 and 6.4. Finally, the curd is kept under conditions where the curd undergoes a ripening process to obtain the finished cheese, and the end pH in the cheese will reach 4.9 to 5.3 within the first 48 hours, due to the metabolic activity of the starter culture.

In order to accelerate the ripening of the cheese, which is initiated by the selected starter culture added to the cheese milk, a ripening agent, such as a microorganism or an enzyme may be added to the cheese milk or to the cheese curd. Thus, a ripening agent is only added in addition to a starter culture and/or milk clotting agent.

The choice of starter culture organism is based on tradition, the flavour and texture desired in the cheese and the rate and extent of acid development desired during the entire manufacturing process and in the finished cheese. Useful commercial dairy starter cultures are generally composed of lactic acid-producing lactic acid bacteria. In the present context, the expression "lactic acid bacteria" designates a group of Gram-positive, catalase negative, non-motile, microaerophilic or anaerobic bacteria, which ferment sugar with the production of acids such as lactic acid as the predominantly produced acid, acetic acid, formic acid and propionic acid. The industrially most useful lactic acid bacteria are found among *Lactococcus* species, *Streptococcus* species, *Enterococcus* species, *Lactobacillus* species, *Leuconostoc* species and *Pediococcus* species. The starter culture organisms will continue to ferment sugar until conditions within the cheese prevent it, i.e. unfavourable pH, salt and/or temperature conditions. As the activities of the starter culture organism in general is desired throughout the whole cheese process, i.e. both during the coagulation of the milk proteins and during cheese ripening, the conditions within and around the cheese are carefully selected in order to prevent the killing of all the added organism.

It is evident from the above description of the traditional cheese making process that the different activities of the added starter culture organism to the cheese milk initiate the cheese ripening processes and thus to a large extent determine the pH, taste, flavour, aroma and texture characteristic of the resulting cheese curd and cheese type. This means that the type of cheese is determined at an early stage of the process namely when the starter culture is added to the cheese milk.

The dairy plant must therefore decide at an early stage of the cheese making process, i.e. prior to adding the starter culture to the cheese milk, which type of cheese it is desired to make. This implies that the dairy plant is restricted to produce only one type of cheese at a time and/or one type of cheese for each processing line. However, in the dairy industry there is a clear trend towards larger production units, which are designed to produce cheese at the shortest possible time, which are more cost effective and flexible and which can be operated with little manpower.

It is therefore an important objective of the present invention to provide an improved method of providing a cheese, which is adapted to the increasing demand for higher flexibility in the modern cheese production. The present method gives the dairy plant the possibility at a later stage, i.e. after the cheese curd has been obtained and/or at the ripening stage of the cheese curd, of the cheese manufacturing process to decide which cheese type to produce. Furthermore, the present method implies that the dairy plant can produce a range of different types of cheese based on a single batch of cheese curd. In addition, more curd per working hour can be produced using the same equipment, automation of the process can be introduced more readily and be used more safe/homogeneous with less hazards and bacteriophage attacks, which are a common problem in traditional cheese production methods, can be eliminated. Furthermore, the method provided herein implies that the dairy plant operators can more easily control the ripening of the cheese.

The method according to the present invention is based on the surprising findings that the cheese type can be determined at a later stage of the cheese manufacturing process by initially preparing a cheese curd using a curdling agent and subsequently, after the curd has been obtained, introducing into the cheese curd a lactic acid bacterial starter culture in order to bring about the main ripening of the cheese, the activity of which culture is thereby determining the desired pH, texture and sensory parameter such as taste, flavour and aroma of the resulting cheese. As the lactic acid bacterial starter culture is introduced into the cheese curd, the taste and texture characteristic of the resulting cheese are determined at a late stage of the cheese making process. This implies that it is possible to produce one large batch of cheese curd which may subsequently be divided into smaller portions each of which can be inoculated with different conventional or specifically designed lactic acid bacterial starter culture to obtain different types of cheese or different ripening profile (storage time) based on the same cheese starting material.

Various processes for preparing a cheese are known in the art wherein a cheese ripening agent, e.g. a mould or an enzyme such as a lipase, is added to a conventionally produced curd prior to ripening. DE 195 46 345 describes a method for the manufacturing of Blue cheese. According to the traditional Blue cheese manufacturing, e.g. the Danablue process, a starter culture organism, a milk clotting agent and spores of *P. roqueforti* are added to the cheese milk subsequent to the coagulation and salting steps the resulting cheese curd is exposed to air due to piercing of the cheese. In DE 195 46 345 the fungal spores are added in combination with the piercing. Besides focusing on giving the best opportunities for the *P. roqueforti* spores to survive in the Blue cheese, this process involves the use of a traditional cheese curd prepared by using a traditional starter culture and a milk clotting agent added to the cheese milk.

Another example of a cheese manufacturing process is described in U.S. Pat. No. 3,973,042 wherein a mixture of a microbial lipase and spores of *P. roqueforti* is added to a traditionally produced cheese curd after draining off the whey. In this disclosure the lipase is important for obtaining the characteristic rancid taste in the Blue cheese.

Accordingly, the cheese industry has until now not been in the possession of a process for the manufacturing of cheese wherein a lactic acid bacterial starter culture is added to the cheese curd. Thus, it has until now not been possible to determined the cheese type at a late or different stage of the process by adding a lactic acid bacterial starter culture to the cheese curd. Reason for this may be traditional way of thinking and conservatism in the cheese industry as it is not common to change the old traditional cheese-manufacturing processes.

SUMMARY OF THE INVENTION

Accordingly, the present invention provides a method for providing a cheese, the method comprising the steps of
  (i) adding a curdling agent to a cheese milk,
  (ii) carrying out conventional cheese curd preparing steps,
  (iii) adding to the resulting cheese curd of step (ii) a lactic acid bacterial starter culture, and keeping the cheese curd resulting from step (iii) under ripening conditions to obtain he cheese.

DETAILED DISCLOSURE OF THE INVENTION

Thus, in its broadest aspect the present invention provides a method for providing a cheese by adding to a cheese curd a lactic acid bacterial starter culture determining the desired pH, sensory parameters and texture of the resulting cheese. This implies, that a starter culture optionally added to the cheese milk as a curdling agent, in contrast to the conventional cheese technology, is not the primary factor determining the pH, sensory parameters and texture of the resulting cheese. This effect is, in accordance with the present invention, shifted to the lactic acid bacterial starter culture which is added after the curd has been obtained.

In accordance with the invention, the cheese curd is provided by adding a curdling agent to the cheese milk. In the present context, the expression "curdling agent" relates to any compounds, substances or microorganism which, when added to the cheese milk, is capable of clotting the milk proteins. However, in contrast to a conventional starter culture used in accordance with the conventional cheese manufacturing technology the curdling agent is not the primary or sole agent determining the pH, texture and sensory parameter such as taste, flavour and aroma of the resulting cheese. In preferred embodiments, the curdling agent is an agent selected from the group consisting of an enzyme, a microorganism and an acid or a combination of one or more of these agents.

In the present context, the term "cheese curd" is used interchangeably with the term "coagulum" and relates to the material remaining after the coagulation of the milk proteins and draining off the whey. In accordance with the invention the cheese curd can be prepared from any type of milk or milk component including e.g. cow's milk, buffalo milk, goat's milk or sheep's milk. Additionally, such a curd may contain whey or any milk ingredient substitutes e.g. butter fat replacements like plant oil or vegetable proteins. Prior to use, the milk may be treated in such a manner that the milk has a low content of spoilage microorganisms. Accordingly, the milk can be pasteurised or the milk can be treated by a combination of centrifugal separation and microfiltration or any other conventional method for treating or standardising the cheese milk.

In accordance with the invention, the acidification and coagulation of the milk may be initiated by chemical acidification or by adding a microbial starter culture, such as a conventional or specifically designed lactic acid bacterial culture. Useful compounds for the chemical acidification of the cheese milk include any food grade acid, which is allowed for the use in food or feed products such as e.g. lactic acid, acetic acid, citric acid or glucono delta lactone. It was found that lowering the pH in the cheese milk caused sufficient destabilisation of the casein to result in coagulation or clotting of the milk proteins. Thus, in one preferred embodiment of the method according to the present invention, the cheese curd is prepared by acidifying the milk to a pH which is less than pH 6.7, such as less than pH 6.5, e.g. less than pH 6.2, including less than pH 6.0, such as less than pH 5.7, e.g. less than pH 5.5, including less than pH 5.2, such as less than pH 5.0, e.g. less than pH 4.8.

Heating of the cheese milk can enhance or accelerate the coagulation of casein. In traditional cheese manufacturing higher temperature is not a possibility, because of the thermal instability of the added starter culture organisms.

However, when the pH in the cheese milk is above pH 5.0 it may under some circumstances be required to add a milk clotting agent to the milk in order to obtain a sufficient coagulation of the milk proteins. Thus, in one useful embodiment, the cheese curd is prepared by adding a milk clotting enzyme to the cheese milk in addition to the food grade acid or the microbial starter culture. When used in accordance with the above method any kind of milk clotting agent may be used, such as a native enzyme derived from microbial or animal tissue sources or a milk clotting enzyme provided as a gene product of recombinant cells expressing a milk clotting enzyme of animal or microbial origin. In one useful embodiment, the curd is prepared by adding a milk clotting enzyme to the cheese milk without or by limited acidification of the milk.

In one useful embodiment, the curdling agent added to the cheese milk in step (i) of the present invention is a microorganism which is selected from the group consisting of a bacterial species, a fungal species and a yeast species. Useful bacterial species are lactic acid bacterial species such as *Lactococcus* species including *L. lactis* and *L. cremoris*, *Lactobacillus* species including *L. casei*, *L. paracasei*, *L. delbrueckii*, *L. helveticus* and *L. acidophilus*, *Bifidobacterium* species including *B. bifidum*, *B. lactis* and *B. longum*, *Streptococcus* species including *S. thernophilus* and *S. faecium*, *Leuconostoc* species including *Ln. lactis* and *Ln. mesenteroides*, *Micrococcus* species, *Enterococcus* species and *Pediococcus* species. Other useful bacterial species include *Brevibacterium* species including *B. casei*, *Staphylococcus* species, *Arthrobacter* species and *Corynebacterium* species can be used.

Useful cultures of fungi include e.g. *Penicillium* species such as *P. roqueforti* and *P. candidum*, *Endothia parasitica*, *Aspergillus* species such as *A. niger* and *Torelospora* species such as *T. delbrueckii*. Yeast species which can be useful as a curdling agent in a method according to the invention include species of *Debaryomyces* species such as *D. hansenii*, *Geotrichum candidum*, *Saccharomyces* such as *S. cerevisiae* e.g. in the form of baker's yeast and *S. kefir*, *Kluyveromyces* species such as *K. maxianus* and *K. thermotolerans*, *Candida valida* and *Torula kefir*. Under certain circumstance can it be useful to add as a curdling agent a mixture of any of the above bacterial, fungi and yeast species.

One useful embodiment is wherein the cheese curd prior to step (iii) of the present method does not contain viable lactic acid bacteria. In the present context, the expression "not containing viable lactic acid bacteria" refers to bacteria which have lost their capability to reproduce, but which may still contain active intracellular enzymes, and which may affect e.g. the protein or peptide decomposition of the cheese milk. In one useful embodiment, the cheese curd is prepared by adding a lactic acid starter culture organism and a milk clotting enzyme to the cheese milk followed by heating the inoculated milk resulting in the irreversible thermal inactivation of the starter organisms. In one further useful embodiment, the lactic acid bacterium is a sensitive bacterium being sensitive to e.g. temperature, pH, bacteriocin such as nisin, or salt. In the present context, the expression "irreversible inactivation" refers to the killing or lysis of the organism such that the resumption of the metabolic activity or the ability to reproduce itself is not possible even after the temperature is lowered. It will be understood, that it is possible to use other means to provide unfavourable conditions for the organism in order to irreversibly inactivate the organism or to provide a curd not containing viable lactic acid bacteria, such as e.g. nisin, high salt concentration or an unfavourable pH or ripening temperature. In accordance with the invention, the added starter culture organism is preferably active in the cheese milk for at the most 2 hours, such as at the most 1 hour, e.g. at the most 30 minutes, including at the most 10 minutes, such as at the most 8 minutes, including at the most 5 minutes, e.g. at the most 3 minutes, such as the most 2 minutes.

Thus, the starter culture organism added to the cheese milk is only allowed to perform its metabolic activities for at very short period in the cheese process before the organism is inactivated and rendered non-viable as explained above. This is in contrast to the traditional cheese making process, wherein the starter culture organisms are kept alive essentially during the entire process.

By effectively killing or lysing of the lactic acid starter culture organism added to the cheese milk it is the lactic acid bacterial starter culture subsequently added to the cheese curd which determines the type of the finished cheese, and it is the later added lactic acid bacterial culture which is responsible for the overall ripening profile.

In one further useful embodiment, the curdling agent is a lactic acid bacterium, which substantially only produces acids, such as lactic acid or citric acid, and which substantially does not produce flavour compounds such as acetate, diacetyl, acetoin, acetolactate, acetaldehyde or butanediol or other aromatic compounds or compounds, which may contribute significantly to the finished cheese.

In one useful embodiment, and as explained above, the cheese curd is divided before step (iii) in at least two portions each of whereto a lactic acid bacterial starter culture is added in step (iii) to obtain different types of cheese. By dividing the cheese curd in smaller portions, the cheese industry has the possibility to add to the individual curd portions at a late stage of the process a traditional or a specifically designed lactic acid bacterial starter culture to obtain different types of cheese or different ripening profile for the same cheese type.

In preferred embodiments, the cheese curd is a curd which essentially has no flavour or textural characteristics of the finished cheese, and which in the present context also is referred to as a "base curd". As explained above and as shown in the below Examples, it is possible to prepare a cheese curd by chemical acidification, bacterial acidification and optionally, without the addition of a milk clotting agent. Thus, by not using a starter culture in the traditional sense for the preparation of a cheese curd, the resulting curd does not have the taste and/or the texture of the cheese to be obtained. Thus, when preparing a cheese curd using a curdling agent such as an acid, a milk clotting agent and/or a starter culture organism, which is kept alive for only a very short time and thus essentially does not confer any specific flavour or textural characteristics to the finished cheese, the resulting curd has, in contrast to when using a starter culture in accordance with the conventional cheese manufacturing processes, essentially no flavour or textural characteristics of the finished cheese. This type of curd is also useful when divided into smaller portions each of which can be inoculated with a conventional or specifically designed lactic acid bacterial starter culture to obtain different types of cheese or different ripening for the same cheese type originating from the same cheese curd.

A major advantage of the method according to the invention is, when providing a cheese curd without the traditional addition of a starter culture and a milk clotting agent to the cheese milk, the fact that the whey drained off from the cheese curd has maintained some of its high content of valuable components, as the whey components are not subjected to the same degree of degradation by a starter culture, milk clotting agent, added proteolytic enzymes and/or other ripening agents as in the traditional cheese processes.

In a preferred embodiment, the curdling agent in step (i) of the method according to the invention is added to the cheese milk in combination with at least one compound selected from the group consisting of a pH regulating agent, a microorganism, an enzyme, a colouring agent, a protein, a vitamin, a mineral, a bacterial nutrient, a whey component and a dietary fibre. In one useful embodiment, the microorganism is one which is selected from the group consisting of a bacterial species, a fungal species and a yeast species.

In accordance with the invention, after the curdling agent is added to the cheese milk, conventional cheese curd preparing steps are carried out in step (ii) of the present method. In the present context, the expression "conventional cheese curd preparing steps" relates to the cutting and stirring of the coagulated proteins allowing the whey to be drained off. Accordingly, when the coagulum is sufficiently set, the cheese curd is cut into pieces in order to facilitate the removal of the whey. When the cheese curd has been cut, the cheese curd pieces are stirred and subjected to a heat treatment, typically for 30 to 120 minutes and typically at a temperature in the range of 32 to 60° C. in order to modify the protein structure for enhanced syneresis and also to destroy certain groups of added microorganisms and undesired contaminating microorganisms and to promote acid development. The heat treatment can be carried out by adding hot water to the curd after cutting at an amount which is typically in the range of 20–50% by weight, calculated on the total weight of the cheese milk, or by treating the curd in a heated jacketed vessel. Optionally, the resulting cheese curd can be pressed before and/or after the introduction of the cheese ripening agent to confer to the cheese a specific shape and consistency. The curd can furthermore be obtained by any kind of filtration processes, such as ultrafiltration and microfiltration, and concentration techniques.

The next step, i.e. step (iii) of the method according to the invention, is the addition of a lactic acid bacterial starter culture to the cheese curd obtained in step (ii). As already mentioned above, the overall idea of the present invention is, in contrast to conventional cheese manufacturing processes, to use a lactic acid bacterial starter culture at a later stage of the cheese manufacturing process, i.e. after the cheese curd has been obtained and thus to initiate the ripening of the cheese at that stage of the process. Accordingly, the added lactic acid bacterial starter culture is acting as a cheese ripening agent or as a cheese conditioning agent, and provides the cheese curd or cheese with the pH, sensory parameters and textural characteristics associated with the desired cheese or cheese type. It will be understood, that a mixture of two or more lactic acid bacteria starter cultures can be added to the cheese curd.

In the present context, the terms "adding", "introducing" and "injecting" are used interchangeably and relate to the addition or introduction of the lactic acid bacterial starter culture into the cheese curd by means explained herein below. The result of the introduction of the lactic acid bacterial starter culture to the cheese curd is the obtainment of a ripeable cheese curd when the cheese curd resulting in step (iii) of the present method is kept under ripening conditions. In the present context, the expression "ripeable cheese curd" relates to a cheese curd which, when placed under appropriate ripening conditions, is capable of undergoing ripening into the specifically desired cheese type. It will be appreciated that the expression "ripening conditions" relates to conditions which permit the ripeable cheese curd to ripe into a finished cheese. The temperatures for ripening are usually within the range of 2 to 30° C. In one useful embodiment, the ripeable cheese curd is placed in a vacuum package in order to allow ripening. Thus, the lactic acid bacterial starter culture is introduced into the cheese curd in order to give the resulting cheese its specific characteristics.

In accordance with the present invention, a suitable lactic acid bacterial starter culture is one which confers to the cheese curd the desired pH, flavour and/or textural characteristic as it has been explained above and which is capable of maintaining its and metabolically activity after introduction into the cheese curd in step (iii) to a degree which results in the desired ripening effect. A useful lactic acid bacterial starter culture is a culture of species selected from the group consisting of *Lactococcus* species including *L. lactis* and *L. cremoris*, *Lactobacillus* species including *L. casei*, *L. paracasei*, *L. delbrueckii*, *L. helveticus* and *L. acidophilus*, *Bifidobacterium* species including *B. bifidum*, *B. lactis* and *B. longum*, *Streptococcus* species including *S. themophilus* and *S. faecium*, *Leuconostoc* species including *Ln. lactis* and *Ln. mesenteroides*, *Micrococcus* species, *Enterococcus* species and *Pediococcus* species. Other useful bacterial species include *Brevibacterium* species including *B. casei* and, *Staphylococcus* species, *Arthrobacter* species and *Corynebacterium* species can be used.

It will be understood, that the starter culture organism, when added to the curd, is added under different conditions than normally, such as a lower pH, and thus it may be useful to design a specific starter culture or a derivative of the above mentioned starter cultures which is capable to perform the desired activities under the cheese curd conditions. Thus, it will be appreciated that such a lactic acid bacterial strain can be selected from the group consisting of a wild-type strain, a mutant strain, a metabolically engineered strain or a genetically modified strain of any kind of bacterium useful in the dairy industry. As used herein the expression "genetically modified bacterium" is used in the conventional meaning of that term i.e. it includes strains obtained by subjecting a strain to conventionally used mutagenisation treatments including treatment with a conventional chemical mutagen or to spontaneously occurring mutants. Furthermore, it is possible to provide genetically modified lactic acid bacteria by random mutagenesis or by selection of spontaneously occurring mutants.

From a contamination point of view it is important that the introduced starter culture is biologically pure, i.e. it should only contain the desired microorganisms and/or enzymes and no or only few foreign microorganisms as contaminating organisms. In dairy products contamination with undesired or spoilage bacteria, fungi and bacteriophages is particularly serious, as such organisms may attack the lactic acid bacterial starter culture, i.e. the microorganisms, resulting in cheese ripening failures.

As mentioned above the specific selection of the strains for the lactic acid starter culture will depend on the particular cheese to be made. Thus, in a preferred embodiment, the lactic acid bacterial species is a selected species, which is conventionally used in the manufacturing of a particular cheese type or variety. Such a particular cheese type can be selected from the group consisting of a hard and semi-hard cheeses including as examples Danbo, Havarti, Cheddar, Edam, Gouda, Muenster, Gruyére Emmental, Parmesan, Romano and Provolone, a processed cheese including American cheeses and Fondue cheeses, a white cheese including Camembert, Coulommiers and Brie, a white cheese, a blue cheese including Roquefort, and a fresh cheese including Feta, cream cheeses, semi-soft cheeses, soft cheeses, Neufchatel, Mozzarella and Ricotta. As used herein the term "hard and semi-hard cheese" refers to a cheese typically having a moisture content of 55% by weight or less.

In a preferred embodiment, the lactic acid bacterial starter culture is added to the cheese curd in combination with at least one compound selected from the group consisting of a pH regulating agent, a microorganism, an enzyme, a aroma compound, a flavouring agent, a colouring agent, a protein, a vitamin, a salt, a mineral, a bacterial nutrient, a whey component and a dietary fibre. The salt(s) may be selected from an alkali metal salt such as NaCl or a phosphate and alkaline earth metal salts including phosphates, chlorides or carbonates.

In one useful embodiment, the above mentioned microorganism, which may be added in addition with the lactic acid bacterial starter culture, is selected from a fungal species, a yeast species and a bacterial species. Useful cultures of fungi include e.g. *Penicillium* species such as *P. roqueforti* and *P. candidum, Endothia parasitica, Aspergillus* species such as *A. niger* and *Torelospora* species such as *T. delbrueckii*. Yeast species which can be useful as a cheese ripening agent in a method according to the invention include species of *Debaryomyces* species such as *D. hansenii, Geotrichum candidum, Saccharomyces* such as *S. cerevisiae* e.g. in the form of baker's yeast and *S. kefir, Kluyveromyces* species such as *K. maxianus* and *K. thennotolerans, Candida valida* and *Torula kefir*. In accordance with the invention, the culture of microorganisms to be introduced into the cheese curd may comprise a mixture of any of the above bacterial, fungi and yeast species.

Useful microorganisms may be wild-type strains as isolated from their natural environment. It may, however, be advantageous to use microbial strains, which have been improved be selection, by mutation or by genetic recombination according to the methods known in the art. The species are selected from laboratory screening test where the production conditions for the cheese type concerned are simulated. Also the mixture of species of microorganisms would be useful in accordance with the invention.

As mentioned above, it is convenient to use an enzyme in combination with a lactic acid bacterial starter culture when added to the cheese curd in order to improve a ripening effect. Thus, in preferred embodiments, an enzyme is added in a ripeningly effective amount selected from a peptidase, a protease, a lipase and a carbohydrase. In the present context, the expression "a ripeningly effective amount" relates to an amount of the enzyme, which is sufficient to obtain the desired characteristic of the resulting ripened cheese when kept under the above ripening conditions.

Furthermore, plasminogen activators, plasmin, catalysts or different kinds of compounds having a proteolytic effects can be introduced into or added to a cheese curd in combination with the lactic acid bacterial starter culture in order to confer to the cheese the desired pH, taste, flavour and texture characteristics.

In a preferred embodiment, the lactic acid bacterial starter culture when used alone or in combination with other agents, comprises a liquid phase. A useful liquid phase medium is water including tap water, distilled water or deionised water, or it can be any medium which is suitable for suspending a starter culture such as milk, suspensions of milk solids, whey or solutions containing a mineral or other nutritional ingredients. The liquid medium can further comprise buffering agents and/or microbial nutrients.

The liquid phase is preferably a sterile medium, which is provided by using only sterile ingredients or by subjecting the prepared medium to a treatment whereby contaminating microorganisms are killed or removed. Such treatments include heating at a temperature and for a period of time, which results in a sterile or substantially sterile medium and filtering under conditions where microorganisms are separated from the medium.

Typically, the lactic acid bacterial starter culture comprises lactic acid bacteria in a concentration of $10^5$ to $10^{13}$ CFU per ml. In certain preferred embodiments, the starter culture comprises at least $10^5$ CFU per ml, at least $10^6$ CFU per ml, at least $10^7$ CFU per ml, at least $10^8$ CFU per ml, at least $10^9$ CFU per ml, at least $10^{10}$ CFU per ml, at least $10^{11}$ CFU per ml or at least $10^{12}$ CFU per ml. Conveniently, the starter culture is prepared from a concentrate of starter organisms containing $10^8$ to $10_{13}$ CFU per g. Such concentrates may be in the form of a slurry or paste of freshly grown bacterial cells. However, in industrial production it may be more convenient to prepare the suspension from a frozen or freeze-dried concentrate of the microorganism(s) optionally containing one or more cryoprotective substances. The volume of the lactic acid bacterial starter culture typically introduced into the cheese curd is in the range of 1 to 200 ml per kg of cheese curd. In certain preferred embodiments, the volume of the starter culture in the method of the invention is at least 2 ml per kg of cheese curd, including at least 3 ml per kg of cheese curd, such as at least 4 ml per kg of cheese curd, e.g. at least 5 ml per kg of cheese curd, including at least 8 ml per kg of cheese curd, such as at least 10 ml per kg of cheese curd. However, in further embodiments the volume of the starter culture in the method according to the invention is at least 20, 40, 60, 80, 100, 120, 130 ml per kg of cheese curd or at least 200 ml per kg of cheese curd. The appropriate volume depends on the type of cheese to be made and the concentration of the lactic acid bacterial starter culture. It is essential that the volume introduced does not exceed the volume, which can be absorbed by the cheese curd without conferring to the resulting cheese undesirable wet or soft spots which can be recognised by the consumer.

It may be useful to add to the starter culture one or more nutrients which support survival and activity of the microorganism. In this context, suitable nutrients may be any nutrient normally used in culturing media for particular microorganisms or the liquid medium may be a commercial liquid culture medium such as e.g. the conventionally used tryptic soy broth medium, containing the required nutrients. Typically, such nutrients may be selected from yeast extract, peptides and amino acids; a carbon source which is selected from a monosaccharide, a disaccharide or a polysaccharide; and a vitamin or a mixture of vitamins.

In accordance with the present invention, the lactic acid bacterial starter culture can be introduced, added or transferred into the cheese curd by means known in the art or specific apparatus developed for this purpose. Thus, the advantage is that the starter culture can be introduced by simple technology, which makes it possible to adapt it to already existing equipment or production line at the dairy plant. Furthermore, an apparatus for introducing the lactic acid bacterial starter culture can be placed at any step which involves the processing of the cheese curd and it can be part of the automatic process line.

Depending on the texture of the cheese curd, the lactic acid bacterial starter culture may be introduced before or after pressing. When the cheese curd comprises cheese curd grains the lactic acid bacterial starter culture is transferred to the surface of the cheese curd grains. This can be accomplished in accordance with the present invention by different kind of techniques such as spraying, centrifugation, tumbling, mixing or by using different types of pumps. For example, the spraying technique requires the motion of the cheese curd grains in order to place the lactic acid bacterial starter culture on the surface of the curd grains. This technique requires means for spraying the starter culture onto the curd grains. In general, the introduction of the lactic acid bacterial starter culture in accordance with any of these techniques is performed before pressing the curd or direct at the block former.

In an other embodiment of the present invention, the lactic acid bacterial starter culture is introduced onto the cheese curd grains by mixing using e.g. a machine similar to a butter making machine. In this machine the curd particles, which are transferred to a first working section where the curd fines, are mixed with a solution containing the starter culture. Then the curd and lactic acid bacterial starter culture are separated in another working section. This separation step can be performed in different procedures such as using a screw, which separates the curd grains from the ripening agent solution and conveys the grains to the following step in the production (e.g. cutting and pressing). The flavouring technique from the continuous butter concept could also be used for introducing the lactic acid bacterial starter culture into the homogenous cheese curd. Applying the cheese curd and starter culture to a centrifuge the same technique of conveying the curd by using a screw as described above can be used. A centrifuge which resembles the butter making machine is the decanter centrifuge.

It has been found that it is possible and convenient to introduce the lactic acid bacterial starter culture by means of needles when the cheese curd comprise a firm substance of cheese curd. In the present context, the term "needle" is used in the conventional meaning and relates to any types of needles such a hollow needle, a hypodermic needle, a cannula or a syringe needle. It will be appreciated that the form of the needle depends on the dimension of the cheese curd to be injected. The advantage of using at least one needle for the introduction of the lactic acid bacterial starter culture into the cheese curd is that it is possible to calculate or determine the amount of starter culture introduced and/or absorbed by the cheese curd. Furthermore, as the starter culture is introduced into the cheese curd there is only a minor loss of starter culture during the manufacturing process. For these systems the treatment with the lactic acid bacterial starter culture can be performed after cutting and pressing of the cheese curd, in a figurative sense it could e.g. be in the block former or at other pressing method.

Thus, in one preferred embodiment, the lactic acid bacterial starter culture is added in step (iii) of the method according to the invention to the cheese curd through at least one hollow needle. Any kind of needle can be used in the present apparatus and the physical form of the needle depends on the dimension of the curd to be injected. In order to obtain a sufficient distribution of the starter culture into the curd or in order to introduce different starter cultures at the same time, it can be useful to introduce the lactic acid bacterial starter culture by means of a multiplicity of needles. It has been found that the introduction into the cheese curd of 1 to 200 ml per kg of cheese curd is suitable, provided this volume is distributed by multiple injections such as by means of a multiplicity of needles. In particular, a volume which is in the range of 1 to 50 ml of the lactic acid bacterial starter culture per kg cheese curd has been found to result in an appropriate absorption of the starter culture into the cheese curd. In a specific embodiment, the needle comprises at least one nozzle, which increases the distribution of the starter culture in the curd.

The invention will now be described in further details in the following non-limiting examples.

EXAMPLE 1

Preparation of a Cheese Using Glucono Delta Lactone (GDL) and a Milk Clotting Agent (Chymosin) in the Preparation of the Cheese Curd This example illustrates the preparation of a cheese curd by lowering the pH with glucono delta lactone (GDL) and by using chymosin as a milk clotting agent. Following these treatments the cheese curd was cut and stirred for draining off whey from the cheese curd. Subsequently the cheese was pressed and a conditioning solution containing at least one proteolytic enzyme and/or at least one lactic acid bacterial starter culture was injected into the cheese curd in order to initiate the development of the desired pH, taste flavour, aroma and texture.

Figure 1:
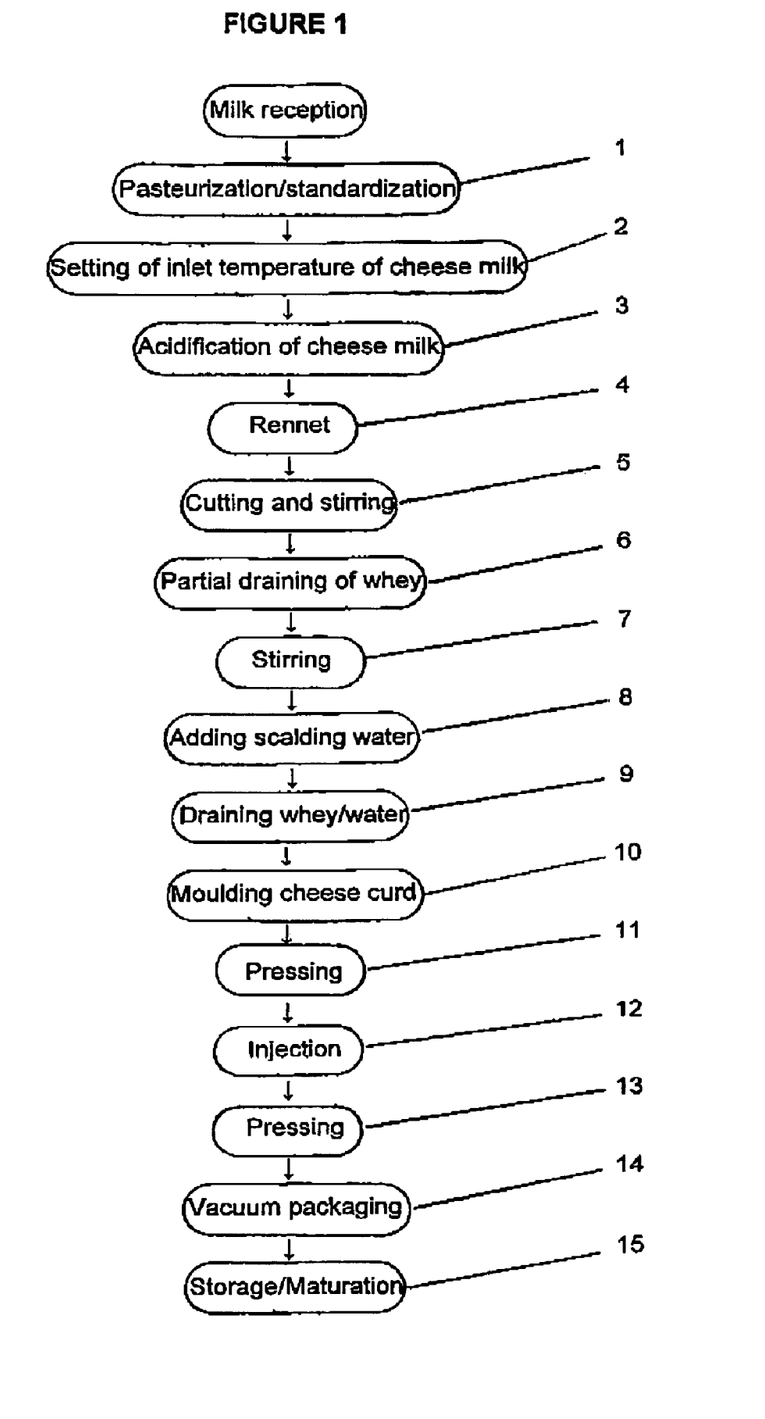
FIG. 1 is a flow diagram showing the process steps in the preparation of a cheese curd using glucono delta lactone and a milk clotting agent.

The process steps are shown in the flow diagram shown in FIG. 1.

Prior to cheese manufacturing the cheese vat and all equipment used for manufacturing were disinfected with hypochlorite. The cheese milk was supplemented with 15 gram potassium nitrate ($KNO_3$) per 100 liter cheese milk in order to prevent growth of undesirable micro organisms.

Seven different conditioning solutions for introduction into the cheese curd were used in this Example and contained:

1. Pure water (control)
2. Traditional cheddar starter culture (Chr. Hansen A/S, Hørsholm, Denmark)
   Chr. Hansen R-604, cell concentration ≈$3*10^9$ CFU./g cheese
3. Chr. Hansen A/S designed conditioning mixture
   Chr. Hansen CR210, cell concentration ≈$1*10^{11}$ CFU/g cheese
   Chr. Hansen LHB-02, cell concentration ≈$5*10^{10}$ CFU/g cheese
   Chr. Hansen *Brevibacterium casei*, cell concentration ≈$5*10^{10}$ CFU/g cheese.
4. Proteolytic enzyme
   10 mg of proteolytic enzyme
   The enzyme was a serine protease from Novo Nordisk A/S, Bagsværd, Denmark.
5. Traditional cheddar culture and the above mentioned Chr. Hansen A/S designed conditioning mixture (1:1)
6. Traditional cheddar culture and proteolytic enzyme (1:1)

7. "Crushed" traditional cheddar culture and the above mentioned Chr. Hansen A/S designed conditioning mixture (1:1)
   The cell-solution was crushed with a one shot homogeniser,
8. "Crushed" traditional cheddar culture, the above mentioned Chr. Hansen A/S designed conditioning mixture and proteolytic enzyme (1:1:1)
   The cell-solution were crushed with a one shot homogeniser.

The flow diagram shown in FIG. 1 shows each individual step in the preparation of a cheese using GDL and chymosin in the preparation of a cheese curd followed by the addition of the conditioning solution. In the following the preparation is explained step-wise, according to the numbers in the flow diagram shown in FIG. 1.

[1]The cheese milk was low-pasteurised, non-homogenised whole milk and the cream used for standardisation was high-pasteurised, non-homogenised cream with 38% fat.

[2]The inlet temperature was set at 30–31° C. and the stirring device moved at very slow speed.

[3]850 gram of GDL per 100 liters of cheese milk was added to lower the pH to about 5.0–5.1. Stirring was continued at slow speed.

[4]30 ml chymosin per 100 liters of cheese milk was added to coagulate the cheese milk. After one minute of stirring, the stirring equipment was removed so that the milk could rest and turn into a gel/coagulum. This process took about 5 minutes.

[5]The gel would release whey because of syneresis, and this was accelerated by cutting the coagel into small cheese cubes (1*1*1 cm). Speeding up the stirring also altered syneresis, first five minutes with double speed and subsequently ten minutes at four times faster speed.

[6]Stirring was stopped and the mixture of whey and cheese curd/cubes was set to rest, and the draining started. 30 liters of whey were drained off (corresponding to one third of total cheese milk).

[7]Stirring was subsequently restarted at the high speed for another ten minutes. Meanwhile the mixture of whey and cheese cubes was heated by warm water being pumped through the jacket of the cheese vat. The temperature of the mixture reached about 38° C.

[8]The stirring was continued at the same speed as mentioned above for twenty minutes. 60 liters of 44–46° C. warm scalding water was added through a nozzle at a flow rate of 10 liter/minute (corresponding to two thirds of total cheese milk).

[9]The cheese coagulum was allowed to settle and the whey was drained off. All whey/water was drained off and the cheese curd was placed on a perforated strainer.

[10]Cheese curd was wrapped in a cheese cloth and placed in a hoop. Each container was filled with 400–500 g cheese. The hoop and lid were made of perforated stainless steel.

[11]Cheese curd was pressed five minutes at a pressure of 2 bar. Each cheese was then removed from its container and unwrapped. Afterwards it was carefully wrapped again, and turned upside down in the moulding container.

[12] On top of each cheese a plastic disc was used as a template to centre the cheese, injection of the conditioning solution was practised by letting a needle penetrate the plastic disc, cheesecloth and cheese curd. The needle was about 4 cm in length, and each cheese was about 8 cm high, meaning that all 4 ml of the conditioning solution were injected into the middle of the cheese. The above mentioned seven conditioning solutions were used, and in total three cheeses were injected with the same solution in order to follow maturation.

[13]The plastic discs were removed, and the lid placed on each hoop container. The cheese was placed in the press, and pressed for 20 minutes at a pressure of 6 bar.

[14]After pressing, each cheese was placed in a vacuum plastic bag together with 4 gram of sodium chloride (corresponding to 8–10 g NaCl per 1 kg cheese). Then the cheeses were packed using full vacuum (98–100%) and sealed with heat, and further ripening was performed.

[15]The cheeses were stored for two weeks at 16° C. and then moved to a 9° C. storage room for further ripening. The cheeses were analysed after 3 weeks of ripening.

After storage, the cheeses were subjected to chemical analysis, i.e. measurement of pH of the cheeses and the content of fat, water, NaCl, total nitrogen (NT), pH 4.4 soluble nitrogen (SN).

Results

The cheese manufacturing process was simple and without any complication. The cheese curd was easy to handle and the produced cheese was comparable to traditional semi-hard cheese. The texture was still rubbery and elastic after 3 weeks maturing. The conditioning solution worked at the low pH (5.2). Because of the artificial chemical acidification the taste was slightly affected.

TABLE 1.1

Cheese characteristics after 3 weeks at ripening.

| Variable (measured) | Conditioning solution | | | | | | |
|---|---|---|---|---|---|---|---|
| | No. 2 | No. 3 | No. 4 | No. 5 | No. 6 | No. 7 | No. 8 |
| pH | 5.09 | 5.14 | 5.28 | 5.12 | 5.01 | 5.14 | 5.24 |
| % moisture | ≈42.7 | ≈42.7 | ≈42.7 | ≈42.7 | ≈42.7 | ≈42.7 | ≈42.7 |
| % salt | ≈2.0 | ≈2.0 | ≈2.0 | ≈2.0 | ≈2.0 | ≈2.0 | ≈2.0 |
| % salt in moisture | ≈4.25 | ≈4.25 | ≈4.25 | ≈4.25 | ≈4.25 | ≈4.25 | ≈4.25 |
| % fat | ≈31.0 | ≈31.0 | ≈31.0 | ≈31.0 | ≈31.0 | ≈31.0 | ≈31.0 |
| % dry matter | ≈57.3 | ≈57.3 | ≈57.3 | ≈57.3 | ≈57.3 | ≈57.3 | ≈57.3 |
| % fat in dry matter | ≈54.1 | ≈54.1 | ≈54.1 | ≈54.1 | ≈54.1 | ≈54.1 | ≈54.1 |
| % moisture in non fat substance | ≈61.9 | ≈61.9 | ≈61.9 | ≈61.9 | ≈61.9 | ≈61.9 | ≈61.9 |
| % Total Nitrogen | ≈27.0 | ≈27.0 | ≈27.0 | ≈27.0 | ≈27.0 | ≈27.0 | ≈27.0 |
| % pH 4.6 SN/TN | 27.0 | 28.9 | 45.5 | 28.5 | 46.4 | 28.0 | 41.1 |

According to the % pH 4.6 SN/TN measured, which refers to the degree of hydrolysis in casein, the results show that controlling of the development of the characteristics of the cheese such as taste, flavour, aroma and texture is tricky when adding to the cheese curd solutions containing proteolytic enzymes. The % pH 4.6 SN/TN numbers for cheeses containing proteolytic enzymes refers to cheeses, which are more than 7 month old. Thus these results demonstrate the necessity of applying a lactic acid bacteria starter culture to the conditioning solution for having the expected characteristic of the specific cheese. Furthermore, the results demonstrate that it is possible at that stage of the process to initiate the ripening of the cheese and thus the development of the desires cheese characteristics.

The use of a specifically developed conditioning solution mixture which has been developed by Chr. Hansen A/S for accelerating the ripening of the cheese, which is initiated by the starter culture and milk clotting agent added to the cheese milk, did not under these conditions provide any additional buster effect to the development of the characteristics of the cheese compared to a traditional cheddar cheese. This indicates the difficulties to decide the culture composition, because the conditions in cheese curd are very much different as media than cheese milk. The ingredients supplier is not used to pick the starter culture microorganisms strain that can work properly/optimal under these conditions.

EXAMPLE 2

Preparation of a Cheese Using Glucono Delta Lactone (GDL) and Lactic Acid in the Preparation of the Cheese Curd.

This example illustrates the preparation of a cheese curd where the pH was lowered using lactic acid and glucono delta lactone (GDL). Following this treatment, the cheese curd was stirred very vigorously to provide heterogeneous cubes of cheese curd and the cheese curd was drained. Subsequently the cheese curd was pressed and the conditioning solution was injected into the cheese, thus the cheese can develop the desired pH, taste flavour, aroma and texture.

Figure 2:
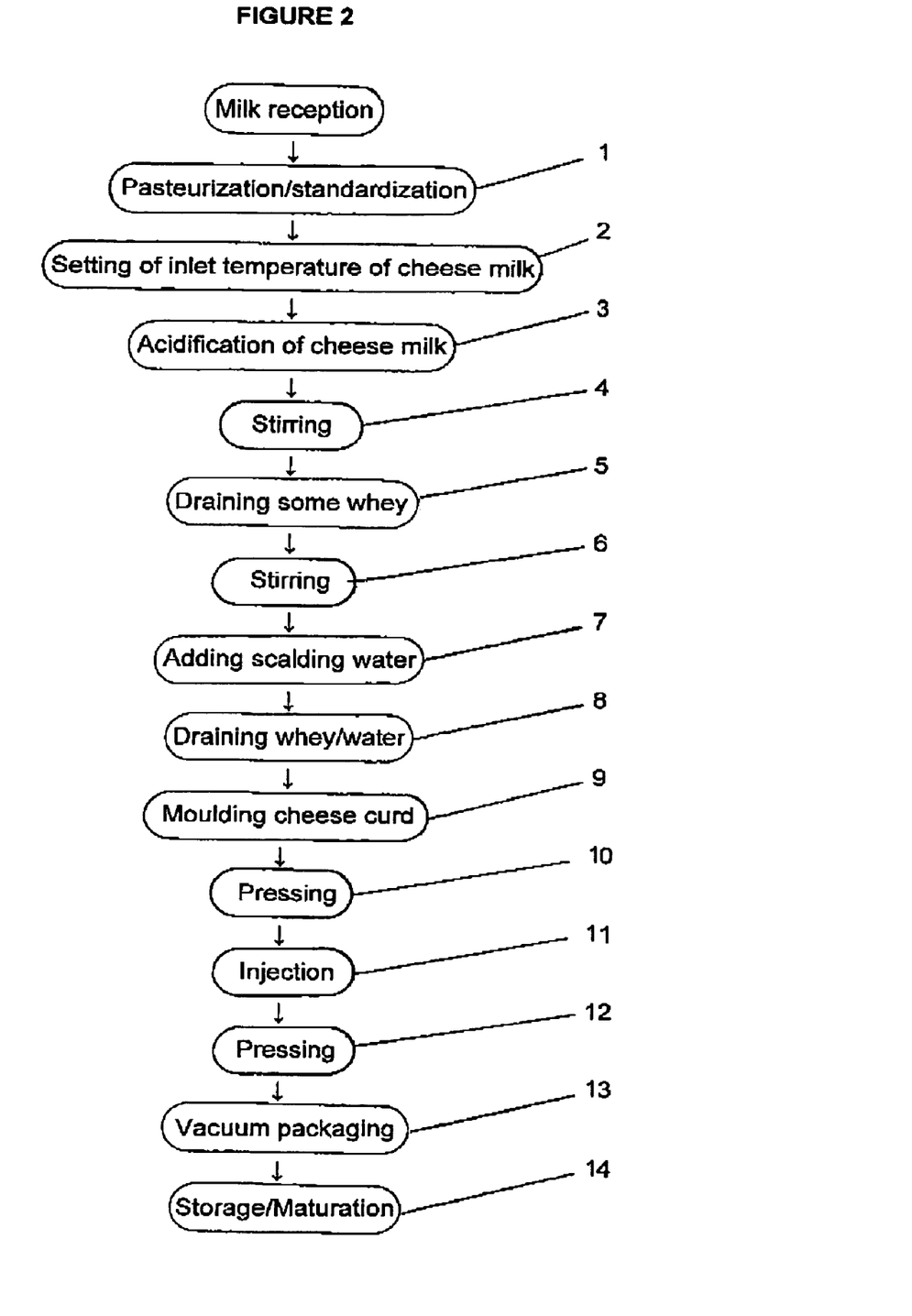
FIG. 2 is a flow diagram showing the process steps in the preparation of a cheese curd using glucono delta lactone and lactic acid.

The process steps for cheese manufacturing using the above acidification step shown in the flow diagram shown in FIG. 2.

Before cheese manufacturing the cheese vat and all equipment used for manufacturing were disinfected with hypochlorite, as explained in Example 1. The milk was supplemented with 15 gram potassium nitrate ($KNO_3$) per 100 liters of cheese milk.

The same seven conditioning solutions used in Example 1 were also used in this Example.

The flow diagram shown in FIG. 2 shows each individual step in the preparation of a cheese using GDL and lactic acid in the preparation of a cheese curd. In the following, the preparation is explained step-wise, according to the numbers in the flow diagram shown in FIG. 2.

[1]The cheese milk was low-pasteurised, non-homogenised whole milk and the cream used for standardisation was high-pasteurised, non-homogenised cream with 38% fat.

[2]The inlet temperature was set at 30–31° C. and the stirring device moved at very slow speed.

[3]2850 gram of GDL and 130 ml lactic acid per 100 liters of cheese milk were added to lower the pH to about 4.5–4.6. Stirring was continued at a slow speed until pH 4.9 was reached, where it was increased about four times.

[4]At pH 4.7 the stirring was speeded up to break down the cheese coagulum, and heterogenous cubes were formed (if the stirring was stopped at pH 4.9 the cheese milk would turn into a coagulum at pH 4.7–4.6 and cutting would be required to obtain cheese cubes). The stirring was continued at the high speed for 15 minutes.

[5]Stirring was stopped and the mixture of whey and cheese curd/cubes was set to rest, and the draining was started. 30 liters of whey were drained off (corresponding to one third of the total cheese milk).

[6]Stirring was then restarted at moderate speed level for another ten minutes. Meanwhile the mixture of whey and cheese cubes was heated by warm water pumped through the jacket of the cheese vat. The temperature of the mixture reached about 38° C.

[7]The stirring was continued at the same speed as mentioned above for a further twenty minutes more. 60 liters of 44–46° C. warm scalding water was added through a nozzle at a flow rate of 10 liters/minute (corresponding to two thirds of total cheese milk).

[8]The cheese curd was settled and the whey was drained off. All whey/water was drained off and the cheese curd was placed on a perforated strainer.

[9]The cheese curd was wrapped in a cheese cloth and placed in a hoop. Each container was filled with 400–500 g cheese. The hoop and lid were made of perforated stainless steel.

[10]The cheese was pressed for five minutes at 2 bar. Each cheese was then removed from its container and unwrapped. Subsequently, it were carefully wrapped again, and turned upside down in the moulding container.

[11]The injection of the conditioning solution was practised by entering a needle penetrate the cheese cloth and into the cheese curd. The needle was about 4 cm in length, and each cheese was about 8 cm high, meaning that all 4 ml of conditioning solution was injected in the middle of the cheese. The above-mentioned seven different conditioning solutions were used and in total three cheeses were injected with the same solution in order to follow maturation.

[12]The plastic discs were removed and the lid placed on each hoop container. The cheese was placed in the press and pressed for 20 minutes at 6 bar.

[13]After pressing, each cheese was placed in a vacuum plastic bag together with 4 gram of sodium chloride (corresponding to 8–10 g NaCl per 1 kg cheese). Then the cheeses were packed using full vacuum (98–100%) and sealed with heat, and then the further ripening of the cheese is performed.

[14]The cheeses were stored two weeks at 16° C. and then moved to a 9° C. storage room for further ripening. The cheeses were analysed after 3 weeks of ripening.

After storage, the cheeses were subjected to chemical analyses, i.e. measurement of pH of the cheeses and the content of fat, water, NaCl, total nitrogen (NT), pH 4,4 soluble nitrogen (SN).

Results

The manufacturing process was simple and without complications. The cheese curd was tough to cut, and therefore stirring was preferred for promoting syneresis (a consequence of this and the lower pH is more smaller fines and loss of cream to the whey). The cheese resembles a Feta cheese or cheese curd for cottage cheese. Because of the artificial chemical acidification the taste was affected.

TABLE 2.1

Cheese characteristics after 3 weeks ripening.

| Variable (measured) | Conditioning solution | | | | | | |
|---|---|---|---|---|---|---|---|
| | No. 2 | No. 3 | No. 4 | No. 5 | No. 6 | No. 7 | No. 8 |
| pH | 4.45 | 4.36 | 4.36 | 4.39 | 4.44 | 4.38 | 4.39 |
| % moisture | ≈54.0 | ≈54.0 | ≈54.0 | ≈54.0 | ≈54.0 | ≈54.0 | ≈54.0 |
| % salt | ≈2.5 | ≈2.5 | ≈2.5 | ≈2.5 | ≈2.5 | ≈2.5 | ≈2.5 |
| % salt in moisture | ≈4.6 | ≈4.6 | ≈4.6 | ≈4.6 | ≈4.6 | ≈4.6 | ≈4.6 |
| % fat | ≈20.0 | ≈20.0 | ≈20.0 | ≈20.0 | ≈20.0 | ≈20.0 | ≈20.0 |
| % dry matter | ≈46.0 | ≈46.0 | ≈46.0 | ≈46.0 | ≈46.0 | ≈46.0 | ≈46.0 |
| % fat in dry matter | ≈43.5 | ≈43.5 | ≈43.5 | ≈43.5 | ≈43.5 | ≈43.5 | ≈43.5 |
| % moisture in non fat substance | ≈67.7 | ≈67.7 | ≈67.7 | ≈67.7 | ≈67.7 | ≈67.7 | ≈67.7 |
| %-Total Nitrogen (TN) | ≈21.8 | ≈21.8 | ≈21.8 | ≈21.8 | ≈21.8 | ≈21.8 | ≈21.8 |
| % pH 4.6 SN/TN | 7.1 | 5.8 | 40.4 | 14.4 | 36.6 | 11.6 | 41.2 |

This example illustrates that it was possible to manufacture a cheese curd by using glucono delta lactone (GDL) and lactic acid for lowering the pH, and without the use of a milk clotting agent.

Thus, after preparing the cheese curd it can be incubated with varies conditioning solutions for providing the cheese of interests.

In the same way as for Example 1, according to % pH 4.6 SN/TN measured, the results again show that controlling of the development of the characteristics of the cheese is tricky when adding to the cheese curd solutions containing proteolytic enzymes. Again the results demonstrates the necessity of applying a lactic acid bacteria starter culture to the conditioning solution.

The use of a specifically developed conditioning solution mixture which has been developed by Chr. Hansen A/S for accelerating the ripening of the cheese, which is initiated by the starter culture added to the cheese milk, did only provide a small buster effect to the development of the characteristics of the cheese compared to a traditional cheddar cheese, however, it is not as dramatic as the proteolytic enzyme (≈40%) looking at % pH 4.6 SN/TN mesurements. The cheese clotting agent in Example 1 is responsible for some of the development in % pH 4.6 SN/TN.

The reason why the hydrolysis in the casein was lower in this experiment compared to the hydrolysis of the casein in Example 1 may be sought in the different pH between the experiments in Example 1 and 2.

The invention claimed is:

1. A method for providing a cheese, the method comprising the steps of
   (i) adding a curdling agent to a cheese milk,
   (ii) carrying out conventional cheese curd preparing steps, including draining off the whey in order to obtain a cheese curd,
   (iii) adding to the resulting cheese curd of step (ii) a lactic acid bacterial starter culture thereby giving the resulting cheese its specific characteristics, including its specific flavour, and keeping the cheese curd resulting from step (iii) under ripening conditions to obtain the cheese.

2. A method according to claim 1 wherein the curdling agent is an agent selected from the group consisting of an enzyme, a microorganism and an acid.

3. A method according to claim 2 wherein the microorganism is selected from the group consisting of a bacterial species, a fungal species and a yeast species.

4. A method according to claim 3 wherein the bacterial species is a lactic acid bacterial species including a *Lactococcus* species, a *Lactobacillus* species, a *Bifidobacterium* species, a *Streptococcus* species, a *Leuconostoc* species, a *Micrococcus* species, an *Enterococcus* species and a *Pediococcus* species.

5. A method according to claim 4 wherein the curd prior to step (iii) does not contain viable lactic acid bacteria.

6. A method according to claim 1 wherein the curdling agent in step (i) is added to the cheese milk in combination with at least one compound selected from the group consisting of a pH regulating agent, a microorganism, an enzyme, a colouring agent, a protein, a vitamin, a mineral, a bacterial nutrient, a whey component and a dietary fibre.

7. A method according to claim 6 wherein the microorganism is selected from the group consisting of a bacterial species, a fungal species and a yeast species.

8. A method according to claim 1 wherein the lactic acid bacterial starter culture added to the cheese curd in step (iii) comprises a lactic acid bacterial species including a *Lactococcus* species, a *Lactobacillus* species, a *Bifidobacterium* species, a *Streptococcus* species, a *Leuconostoc* species, a *Micrococcus* species, an *Enterococcus* species and a *Pediococcus* species.

9. A method according to claim 8 wherein the lactic acid bacterial species is a species conventionally used in the manufacturing of a particular cheese type.

10. A method according to claim 9 wherein the lactic acid bacterial species is a species conventionally used in the manufacturing of a particular cheese type selected from the group consisting of a hard cheese, a semi-hard cheese, a semi-soft cheese, a soft cheese, a processed cheese, a blue cheese, a white cheese and a fresh cheese.

11. A method according to claim 1 wherein the lactic acid bacterial starter culture in step (iii) is added to the cheese curd in combination with at least one compound selected from the group consisting of a pH regulating agent, a microorganism, an enzyme, a aroma compound, a flavouring agent, a colouring agent, a protein, a vitamin, a salt, a mineral, a bacterial nutrient, a whey component and a dietary fibre.

12. A method according to claim 11 wherein the microorganism is selected from the group consisting of a bacterial species, a fungal species and a yeast species.

13. A method according to claim 11 wherein the enzyme is selected from the group consisting of a peptidase, a protease and a lipase.

14. A method according to any of claims 1 to 13 wherein the lactic acid bacterial starter culture is added in step (iii) into the cheese curd through at least one hollow needle.

15. A method according to any of claims 1 to 14 wherein the cheese curd before step (iii) is divided in at least two portions each of whereto a lactic acid bacterial starter culture is added in step (iii) to obtain different types of cheese.

* * * * *